United States Patent

[11] 3,526,168

| [72] | Inventor | Charles R. Brown<br>Shady Side, Maryland |
|---|---|---|
| [21] | Appl. No. | 771,713 |
| [22] | Filed | Oct. 30, 1968 |
| [45] | Patented | Sept. 1, 1970 |
| [73] | Assignee | Westinghouse Electric Corporation<br>Pittsburgh, Pennsylvania<br>a corporation of Pennsylvania |

[54] HYDRAULIC PISTON
4 Claims, 2 Drawing Figs.

[52] U.S. Cl.................................................... 92/181,
92/172
[51] Int. Cl.....................................................F01b 31/00,
F16j 1/00
[50] Field of Search..........................................92/172, 181

[56] References Cited
UNITED STATES PATENTS
268,684  12/1882  Jones............................ 92/172X Primary Examiner—Martin P. Schwadron
Assistant Examiner—Robert R. Bunevich
Attorney—F. H. Henson and F. E. Blake ABSTRACT: A substantially frictionless self-centering hydraulic piston and cylinder assembly for developing a force that may be resisted by a force applied displaced from the piston axis comprising a cylinder having a piston with two spaced apart piston sections separated by a cutaway land area therebetween and with the walls of each piston section tapered in a manner to provide controlled fluid leakage to substantially center the piston in the cylinder during operation.

Patented Sept. 1, 1970

3,526,168

WITNESSES
Helen M. Farkas
James F. Young

INVENTOR
Charles R. Brown
BY
Francis S. Blake
ATTORNEY

HYDRAULIC PISTON

CROSS REFERENCES TO RELATED PATENT APPLICATIONS

A related invention is disclosed in the earlier filed copending patent application Ser. No. 747,198 filed July 24, 1968 in the name of Thomas H. Putman and assigned to the same assignee as the present patent application.

BACKGROUND OF THE INVENTION

Hydraulic pistons for doing work are of course well known and in most instances the friction between the piston and cylinder walls can be ignored. It has been found however, that in certain applications, the amount of friction between the piston and cylinder walls is objectionable. For example, submarine thrust bearings conventionally employ a plurality of hydraulic pistons to absorb the propeller thrust and these thrust forces are often applied offset or displaced from each of the piston axes to cause excessive frictional forces between the piston and cylinder walls to be developed thus causing the pistons to stick. Such sticking conditions result in the impartation of vibrations to the submarine hull which when silent running of the submarine is required, is of course objectionable.

PRIOR ART

So far as is known, there are no prior patents disclosing the self-centering substantially frictionless hydraulic piston arrangement of this invention.

SUMMARY

According to the invention, a substantially frictionless self-centering hydraulic piston and cylinder assembly for developing a force that may be resisted by a force applied displaced from the piston axis is comprised of a cylinder with a piston therein having first and second piston end walls and first and second spaced apart piston sections separated by a first intermediate land area with means to supply fluid under pressure to said cylinder adjacent the first end wall and piston section and to drain fluid from the cylinder adjacent the second end wall and piston from which end a useful force may be exerted. The side walls of the first piston section are tapered from each end at points of maximum clearance with the cylinder to spaced apart points of minimum clearance intermediate the length of the first piston section and with a second cutaway land area therebetween. The side wall of the second piston section is tapered from a point of minimum clearance adjacent the second end wall of the piston to a point of maximum clearance adjacent the first cutaway land area. In the preferred form of the invention, one or more fluid passages may be provided between the first end wall and the first cutaway land area while additional fluid passages may be provided between the second cutaway land area and the second end wall of a piston to facilitate a fluid flow leakage past the piston clearances for centering purposes.

Other objects and advantages of the invention will be apparent with reference to the following specification and drawing.

DESCRIPTION OF THE PREFERRED EMBODIMENT

Figure 1:
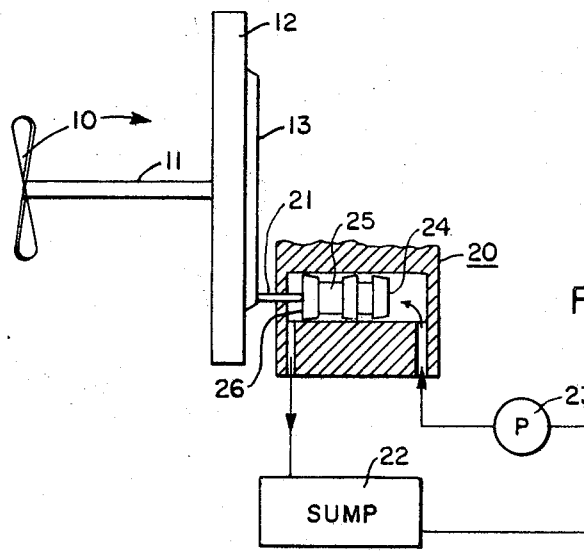
FIG. 1 is a diagrammatic view of a submarine thrust bearing showing in section the frictionless piston of the invention.

Referring to FIG. 1 of the drawings, wherein the invention is diagrammatically shown as applied to a submarine thrust bearing, it should be understood that the many details of the thrust bearing are not shown since an understanding of such details is not necessary for a complete understanding of the present invention. It should also be understood that the frictionless hydraulic piston of the invention may be used for various applications other than a propeller thrust bearing and the invention is therefore not limited to such use. The propeller is shown at 10 to be connected by a shaft 11 to a thrust bearing plate 12 which may be a simple disc member or the like. The smooth thrust bearing surface 13 of the thrust bearing disc 12 revolves with the shaft 11 and propeller 10 and a plurality of hydraulic piston and cylinder arrangements such as the one generally shown at 20 are positioned radially offset around the shaft 11. The reaction thrust forces from the propeller 10 as shown by the direction of the arrow are resisted by the hydraulic pistons such as the hydraulic piston 20 through the connecting shoe arrangements such as the floating pin 21 engaging the smooth thrust bearing surface 13 and the force end of the hydraulic piston 20.

It should be understood that the plurality of radially positioned hydraulic pistons such as the piston and cylinder arrangement shown at 20 are enclosed in a casing having an oil sump such as the sump diagrammatically shown at 22. Oil from the sump 22 is pumped by the pump 23 into the cylinder volume adjacent the first end 24 of the piston member 25. The second end 26 of the piston member bears against the floating pin 21 and oil is drained from the cylinder adjacent the second end 26 and returned to the sump 22. The leakage of oil flowing past the piston member 25 from the first piston end 24 to the second piston end 26 and to the sump 22 serves to center the piston 25 within the cylinder and substantially eliminate any mechanical dragging frictional contact between the walls of the piston member 25 and the cylinder. It has been found that in actual practice the thrust forces transmitted from the thrust bearing surface 13 through the floating connecting pin such as the connecting pin 21 actually tend to develop forces which are displaced from the axis of the piston member 25, due to the dragging frictional contact between the thrust plate surface 13 and the connecting pin 21. These axially displaced thrust forces, if applied to a conventional hydraulic piston would cause the piston to be deflected against the piston walls creating undesirable friction and causing sticking of the piston and vibrations of the bearing arrangement as previously described.

Figure 2:
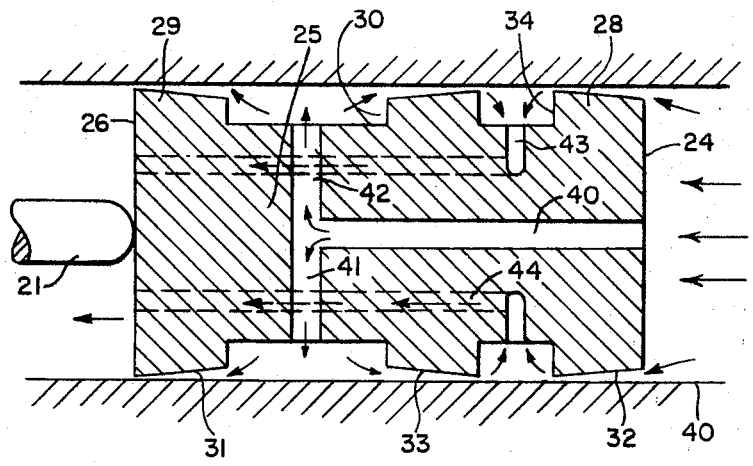
FIG. 2 is an enlarged fragmentary sectional view of the preferred form of frictionless piston of the invention.

Referring now to FIG. 2 of the drawings which shows an enlarged sectional view of the piston member 25, the piston member 25 is comprised of a first piston section 28 and a second piston section 29 spaced apart to provide an intervening first cutaway land portion 30. Fluid under pressure is applied against the first piston end wall 24 adjacent the first piston section 28 and is drained from the cylinder adjacent the second piston end wall 26 adjoining the second piston section 29. It will be noted that the first piston section is provided with two tapered side walls 32 and 33 spaced apart from each other to provide an intervening second cutaway land portion 34. The tapered wall surface 32 tapers from a point of maximum clearance with the cylinder side wall 40 adjacent the first piston end 24 to a point of minimum clearance adjacent the second cutaway land portion 34 while the other or second piston side wall 33 tapers from a point of maximum clearance to the cylinder wall 40 adjacent the first cutaway land area 30 to a point of minimum clearance adjacent the second cutaway land area 34. In other words a first piston section 28 is provided with tapered side walls tapered from each end to space apart points intermediate the ends of the piston section 28 to form an intervening cutaway land area identified as the second cutaway land area 34.

The second piston section 29 is provided with a tapered side wall 31 tapering from a point of maximum clearance adjacent the first cutaway land area 30 to a point of minimum clearance adjacent the second piston end 26 relative to the cylinder wall 40. The tapered clearances thus provided by the piston walls for the first piston section 28 and the second piston section 29 provide for a controlled leakage flow of hydraulic fluid in a manner substantially to center the piston during its operation and to maintain the piston centered against deflecting forces that may be applied to the second piston end 26 offcenter from the piston axis.

In order to facilitate the leakage flow of hydraulic fluid for purposes of centering the piston, one or more fluid passages such as the passages 40, 41 and 42 may be provided between the first piston end 24 and the first cutaway land portion 30 so that fluid pressure adjacent the first piston end 24 will pass therethrough into the first intermediate cutaway land area 30. One or more additional fluid passages such as the passages 43 and 44 may be provided from the second cutaway land portion 38 to the drain end or second piston end wall 26. Thus the controlled fluid flow will be as shown on the drawing by the arrows to pass along the first tapered side wall 32 to the second intermediate cutaway land area 34 and through passages 43 and 44 to the drain end of the piston. Additionally, oil will flow from the pressure adjacent the first piston end 24 through passages 40, 41 and 42 into the second cutaway land area 30 and along the tapered piston walls 33 and 31. The oil passing along the tapered piston wall surface 31 emerges at the drain end or second piston end 26 while the oil passing along the tapered wall surface 33 enters the second cutaway land area 34 and from there passes through passages 43 and 44 to the drain end of the piston. Thus in such manner a controlled flow of hydraulic fluid is continuously passed through the tapered wall sections 31, 32 and 33 of the piston 25 to substantially center the piston 25 while at the same time exerting force through the floating pin member 21.

Various modifications will occur to those skilled in the art.

I claim:

1. A fluid pressure cylinder and piston arrangement in which the piston is self-centering within the cylinder to be substantially frictionless comprising, a cylinder, a piston in said cylinder having first and second end walls, means to supply fluid under pressure in said cylinder adjacent said first end wall of said piston and to drain fluid from said cylinder adjacent said second end wall of said piston, said piston having a first piston section at said first end and a second spaced apart piston section at said second end with a first cutaway land area between the first and second piston sections, said first piston section having side walls tapered from each end at points of maximum clearance with said cylinder to spaced apart points of minimum clearances with said cylinder intermediate the length of the piston section and with a second cutaway land area therebetween, said second piston section having a tapered side wall extending from a point of minimum clearance with said cylinder adjacent the second end wall of the piston to a point of maximum clearance with said cylinder adjacent the first cutaway land area, whereby in response to said fluid under pressure in said cylinder said piston is effective to exert a force at said second piston end and the flow of fluid past the clearances of the piston sections is at the same time effective to center the piston in the cylinder.

2. The invention of claim 1 in which said first piston section is provided with a fluid passage therethrough connected from the first piston end to said first cutaway area.

3. The invention of claim 1 in which said first piston section is provided with a fluid passage connecting said second cutaway area to the second end of said piston.

4. The invention of claim 3 in which said first piston section is provided with a fluid passage therethrough connected from the first piston end to said first cutaway area.